(No Model.)

F. COLEMAN.
SPRING GEAR FOR VEHICLES.

No. 450,363. Patented Apr. 14, 1891.

Witnesses:
James F. Duhamel.
Horace A. Dodge

Inventor:
FREDRICK COLEMAN
BY Dodge & Son,
ATTYS.

UNITED STATES PATENT OFFICE.

FREDRICK COLEMAN, OF ILION, NEW YORK, ASSIGNOR TO THE COLEMAN CARRIAGE AND WAGON COMPANY, OF SAME PLACE.

SPRING-GEAR FOR VEHICLES.

SPECIFICATION forming part of Letters Patent No. 450,363, dated April 14, 1891.

Application filed December 1, 1890. Serial No. 373,208. (No model.)

*To all whom it may concern:*

Be it known that I, FREDRICK COLEMAN, a citizen of the United States, residing at Ilion, in the county of Herkimer and State of New York, have invented certain new and useful Improvements in Running-Gear, of which the following is a specification.

My invention relates to running-gear for vehicles; and it consists in various features of construction hereinafter fully set forth and claimed, whereby the rocking motion so common in side-bar vehicles is in a great measure overcome, and whereby also the running-gear is rendered cheap and strong and the use of independent wheel-guards dispensed with.

Figure 1:
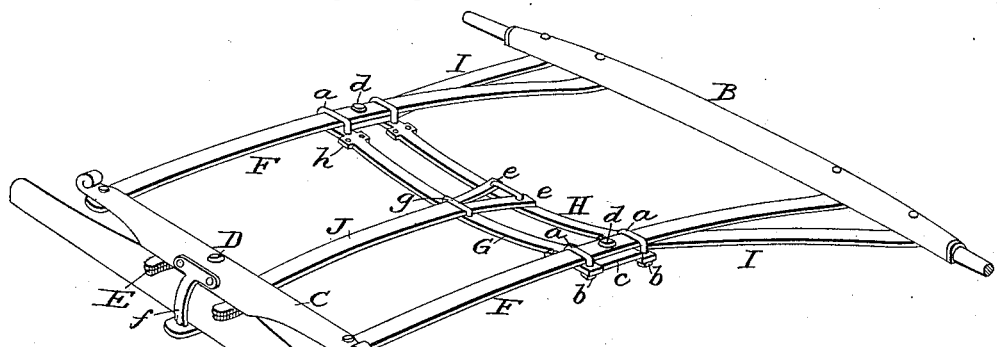
Figure 2:
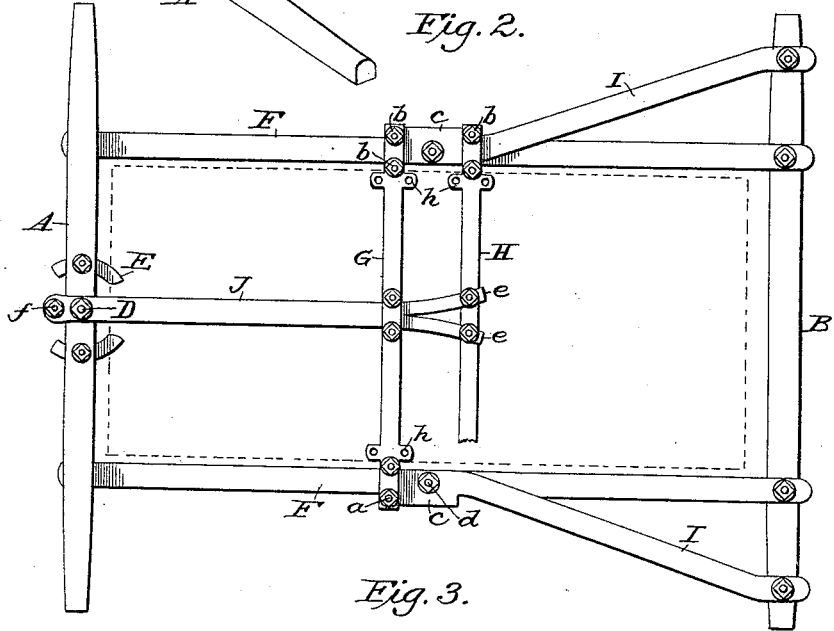

In the drawings, Figure 1 is a perspective view of my improved running-gear; Fig. 2, a bottom plan view with the end of one of the cross-bars broken away to more clearly show the formation of one end of one of the braces, and Fig. 3 a side or edge view.

A indicates the front axle; B, the rear axle; C, the bolster; D, the king-bolt, and E the fifth-wheel or turn-table, all of which parts may be of any suitable construction.

F F are the side springs or bars secured at their rear ends to the under side of the rear axle and at their forward ends to the under side of the bolster in any usual manner. These side bars or side springs are connected at or about their mid-length one with the other by two cross-bars G H, which are separated from each other a short distance, as shown in all the figures. The forward cross-bar G lies flatly against the under side of the side springs, and in order not to weaken the latter the said cross-bar will be attached to the side springs by clips $a$, which pass over the upper side of the side springs and down through the cross-bar, where they are provided with nuts $b$, as shown in Fig. 1. The rear cross-bar H is set away a slight distance from the under side of the side springs, so as to afford room for the forward ends of the diagonal spring-braces I I, which, as shown in Figs. 1 and 2, extend forwardly from the under side of the rear axle near the outer ends of the latter. This rear cross-bar H is secured to the side springs by clips or staples $a$ and nuts $b$ in the same manner, essentially, as in the case of the forward cross-bar.

Figure 3:
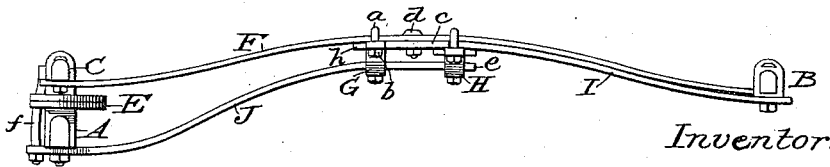

Upon reference to Figs. 1 and 2, it will be observed that the forward ends of the diagonal spring-braces are made approximately rectangular, and that the forward edge or end of the brace abuts squarely against the rear face of the front cross-bar G. It will also be observed upon reference to these figures that the forward ends of the braces are made somewhat wider than the side springs, or, in other words, they are provided or formed with a lateral projecting portion $c$, which projects beyond the sides of the side springs, so as to serve the purpose of a wheel-guard and prevent the wheel from rubbing against the side springs in turning the vehicle. The rear edge of the lateral projecting portion $c$ engages or abuts against the clip or staple $a$, which connects the rear cross-bar with the side spring, from which it will be seen that any longitudinal or lateral movement of the spring-braces independent of the side springs is effectually prevented. The braces will be connected at their forward ends to the side springs by means of bolts $d$, as shown in Figs. 1, 2, and 3.

J designates the front brace or half-perch, which is bifurcated at its rear ends to form arms $e$. (Shown in Figs. 1 and 2.) The half-perch extends forwardly beneath the front axle, where it is provided with a hole or perforation to receive the lower end of the king-bolt, and is provided in advance of the axle with another hole or opening to receive the lower end or stem of a T-bolt $f$, secured at its upper end to the front face of the bolster, as clearly shown in Figs. 1 and 3. This half-perch extends across the forward cross-bar and is clamped or looped thereto by means of a loop, clip, or staple $g$, which passes about the half-perch and through the cross-bar, where it is riveted or provided with nuts, as may be preferred. The arms $e\ e$ of the half-perch, which are flared or set a distance apart, are secured to the rear cross-bar by a clip, clips, or bolts. The cross-bars G and H may be provided with ears $h$ to facilitate the attachment of the vehicle-body.

I am aware that it is not new to enlarge the inner end of a side-spring brace to serve as a rub-iron, and to such feature I make no broad claim.

Having thus described my invention, what I claim is—

1. In combination with the front and rear axles and bolster, the side springs secured at their rear ends to the rear axle and at their front ends to the bolster, the diagonal spring-braces extending from the rear axle to the side springs, the cross-bars connecting the side springs and braces, and the half-perch secured at its forward end to the front axle and having its bifurcated rear end secured to the cross-bars, all substantially as shown.

2. In combination with the axles, bolster, side springs, and cross-bars, the spring-braces extending from the rear axle to the side springs and provided at their forward ends with the lateral projecting portion to fit between the forward cross-bar and the fastenings of the rear cross-bar, and a bolt connecting the forward ends of the braces to the side springs, all substantially as shown.

In witness whereof I hereunto set my hand in the presence of two witnesses.

FREDRICK COLEMAN.

Witnesses:
 THOS. RICHARDSON,
 A. D. RICHARDSON.